(12) United States Patent  
Ogami et al.

(10) Patent No.: US 8,176,468 B2
(45) Date of Patent: May 8, 2012

(54) MULTIVARIABLE TRANSFER FUNCTIONS

(75) Inventors: Kenneth Y. Ogami, Bothell, WA (US);
Doug Anderson, Edmonds, WA (US);
Andrew Best, Seattle, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1187 days.

(21) Appl. No.: 11/518,002

(22) Filed: Sep. 7, 2006

(65) Prior Publication Data

US 2007/0168935 A1    Jul. 19, 2007

Related U.S. Application Data

(60) Provisional application No. 60/741,618, filed on Dec. 1, 2005, provisional application No. 60/741,643, filed on Dec. 1, 2005.

(51) Int. Cl.
*G06F 9/44* (2006.01)
(52) U.S. Cl. ........ 717/106; 717/110; 717/136; 717/140; 717/145
(58) Field of Classification Search .................. 717/111, 717/136
See application file for complete search history.

(56) References Cited

U.S. PATENT DOCUMENTS

| | | | | |
|---|---|---|---|---|
| 5,875,333 A * | 2/1999 | Fish et al. | | 717/109 |
| 6,477,683 B1 * | 11/2002 | Killian et al. | | 716/1 |
| 7,137,100 B2 * | 11/2006 | Iborra et al. | | 717/106 |
| 7,613,599 B2 * | 11/2009 | Bade et al. | | 703/14 |
| 7,761,856 B2 | 7/2010 | Griffin | | |
| 7,992,140 B2 | 8/2011 | Meijer et al. | | |
| 2001/0034743 A1 | 10/2001 | Thomas | | |
| 2003/0145307 A1 * | 7/2003 | Jahnke | | 717/106 |
| 2003/0208723 A1 * | 11/2003 | Killian et al. | | 716/1 |
| 2005/0120340 A1 * | 6/2005 | Skazinski et al. | | 717/140 |
| 2005/0193370 A1 | 9/2005 | Goring et al. | | |
| 2005/0209832 A1 * | 9/2005 | Kasravi et al. | | 703/1 |
| 2006/0015844 A1 | 1/2006 | Johnson et al. | | |
| 2006/0190933 A1 * | 8/2006 | Tzeng | | 717/140 |
| 2006/0225053 A1 | 10/2006 | Lakshman et al. | | |
| 2007/0130531 A1 | 6/2007 | Anderson | | |

OTHER PUBLICATIONS

Cypress, Application Note, "PSoC Express™ Primer: First Introduction," AN2261, Revision A, Mar. 15, 2005, pp. 1-19.
Cypress Microsystems, Application Note, "Global Resources in PSoC™ Designer," AN2221, Revision A, Oct. 15, 2004, pp. 1-6.
Cypress Perform, PSoC Designer™, IDE User Guide, Document # 38-12002 Rev. E, 2002-2005, pp. 2-160.
Cypress Semiconductor PSoC Express 2.0 Transfer Function Author Guide dated Jan. 13, 2006; 16 pages.
Cypress Semiconductor PSoC Express 2.0 Driver Author Guide dated Jan. 9, 2006; 83 pages.
Cypress Semiconductor PSoC Express Containers dated Apr. 27, 2005; 6 pages.
Cypress Semiconductor PSoC XGUI Architecture dated Apr. 7, 2005; 12 pages.

(Continued)

*Primary Examiner* — Thomas K Pham

(57) ABSTRACT

In one embodiment, a method for supporting multivariable functions of an application includes receiving user input pertaining to two or more variables associated with a multivariable function of the application, and then causing code for the function to be automatically generated to update the variables based on the user input.

20 Claims, 9 Drawing Sheets

OTHER PUBLICATIONS

Cypress Semiconductor PSoC Express Data Driven Transfer Function dated Sep. 4, 2005; 8 pages.

Cypress Semiconductor PSoC Express 2.0 State Machine Valuator dated Jun. 29, 2005; 7 pages.

Cypress Semiconductor PSoC Express Transfer Function Architecture.DOC dated Sep. 26, 2005; 7 pages.

U.S. Appl. No. 11/518,482: "Data driven transfer functions," Doug Anderson, filed on Sep. 7, 2006; 40 pages.

USPTO Notice of Allowance for U.S. Appl. No. 11/518,482 dated Nov. 17, 2011; 5 pages.

USPTO Non-Final Rejection for U.S. Appl. No. 11/518,482 dated Jun. 24, 2011; 11 pages.

* cited by examiner

MULTIVARIABLE TRANSFER FUNCTIONS

CROSS-REFERENCE TO RELATED APPLICATIONS

This application claims the benefit of U.S. Provisional Application Nos. 60/741,618 and 60/741,643, both filed Dec. 1, 2005, and incorporated herein by reference in their entirety.

BACKGROUND

1. Field

Embodiments of the invention relate generally to application development and more specifically, but not exclusively, to supporting multivariable functions defining the behavior of an application.

2. Background Information

Embedded system development tools assist users in the creation of applications to be programmed into processing devices such as microcontrollers. One existing embedded system development tool allows a system designer to create an embedded application by combining system input and output (I/O) devices such as LEDs, switches, sensors and fans. The embedded system development tool provides a graphical user interface (GUI) that uses I/O device drivers to represent I/O devices to a user. The GUI also presents to a user various functions that define the behavior of an application. The user can select one of these functions and customize it for the specified I/O devices.

The functions available to users are limited to functions that update a single variable. If a desired system function involves updating several variables, a user has to specify a separate function for each variable and provide logic to define interactions between these functions.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the term "coupled" and its derivatives may be used. "Coupled" may mean that two or more elements are in direct contact (physically, electrically, magnetically, optically, etc.). "Coupled" may also mean two or more elements are not in direct contact with each other, but still cooperate or interact with each other.

Embodiments of the present invention support multivariable functions of customized applications for programming processing devices such as microcontrollers. Examples of multivariable functions may include a State Machine that has both a State and a Transition variable, and a Proportional Integral Differential (PID) Control function having three or more variables.

Figure 1:
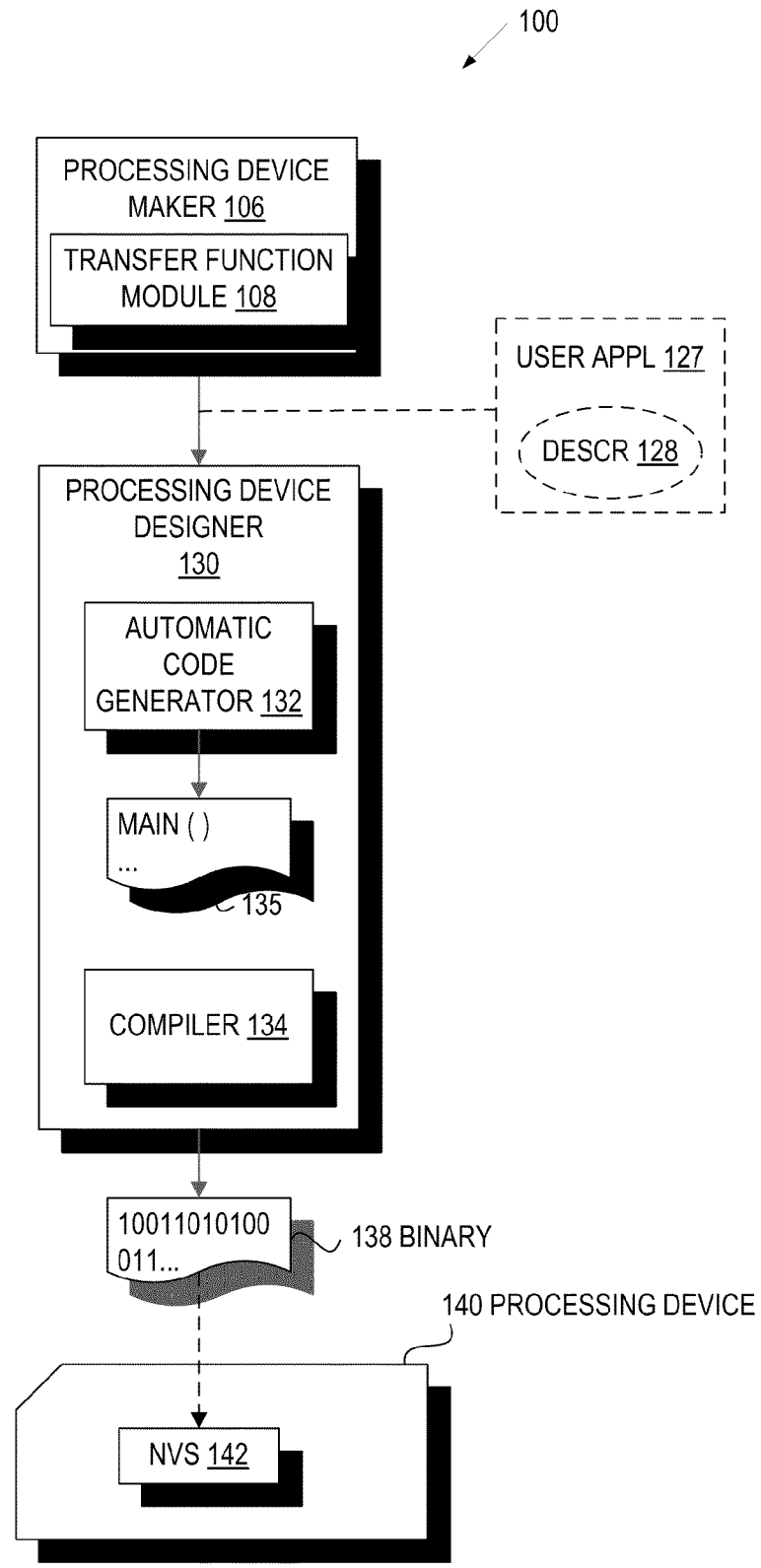
FIG. 1 is a block diagram of one embodiment of an embedded application development tool.

FIG. 1 is a block diagram of one embodiment of an embedded application development tool 100. The tool 100 provides automated code generation of processing device firmware in accordance with one embodiment of the present invention.

The tool 100 includes a processing device maker 106 that is responsible for constructing a user application 127 for implementation on a processing device 140. The user application 127 may be described in a user application description 128. In one embodiment, the user application description 128 is a text file that describes the user's application 127.

In one embodiment, the processing device maker 106 provides a design composition user interface (UI) that allows a user to select input and output (I/O) devices for the design of the application 127. In one embodiment, the design composition UI also allows a user to select valuators for the application 127. A valuator may be used to perform intermediate processing or conditioning (e.g., to convert a value from one type to another).

In one embodiment, the processing device maker 106 includes a transfer function module 108 that facilitates the construction of functions that specify user-controlled logic for defining the behavior of the application 122. These functions may include transfer functions that define relationships between input and output devices selected for the application 122 and/or transfer functions that control output values of valuators selected for the application 122. The functions processed by the transfer function module 108 may include multivariable transfer functions that update multiple system variables. One embodiment of the transfer function module 108 will be discussed in more detail below in conjunction with FIG. 3.

After the user completes the design of the application 127, the user may perform a simulation of the user application 127. The simulation capability enables hardware independence by verifying the application behavior without requiring the user to compile and debug the firmware on the targeted processing device. Simulation also includes the ability to create complex input files to exhaustively test the application behavior with arbitrarily large combinations of input values. The simulation logs the outputs based on the application behavior so that the results may be analyzed by the user.

Next, the user may request that processing device code be automatically generated. The user does not have to perform any actual coding. In one embodiment, after the user selects the targeted processing device 140, the user application description 128 is handed-off to a processing device designer 130 for the generation of processing device code. The processing device designer 130 may include an automatic code generator 132 that assembles the code for the user's application 127 based on the user application description 128. The automatic code generator 132 generates processing device code 135 (e.g., high-level language code, such as C, low-level code, such as Assembly, or a combination thereof).

A compiler 134 compiles the code 135 to generate a binary 138, also known as a binary image or a Read-Only Memory (ROM) image. The binary 138 is loaded into a Non-Volatile Storage (NVS) 142 of the processing device 140. In one embodiment, NVS 142 includes flash memory.

Embodiments of the processing device 140 may include one or more general-purpose processing devices, such as a microprocessor or central processing unit, a network processor, a microcontroller, an embedded Programmable Logic Device (PLD), or the like. Alternatively, the processing device may include one or more special-purpose processing devices, such as a Digital Signal Processor (DSP), an Application Specific Integrated Circuit (ASIC), a Field Programmable Gate Array (FPGA), or the like. The processing device may also include any combination of a general-purpose processing device and a special-purpose processing device.

It will be appreciated that the code 135 is constructed from pre-built and pre-tested code libraries, thus eliminating time wasted on debugging, such as finding syntax errors. It will also be appreciated that the user has generated the user application 127 without referencing a targeted processing device. Instead of choosing a processing device to implement a user application and then writing code for that processing device, embodiments of the present invention allow a user application to be created and then code automatically generated for a particular processing device. Moreover, a user may take a user application, make revisions to the user application, and quickly generate revised programming device code.

As discussed above, the processing device maker 106 allows the user to select I/O devices for the user application 127. In one embodiment, the processing device maker 106 uses device drivers that represent I/O and interface devices to the user. Generally, a device driver is a building block used in the construction of the user application 127. In one embodiment, a device driver maps onto a channel that provides an adaptation layer between the device driver and processing device peripherals. A channel represents resource needs of a hardware function associated with a corresponding device driver. The processing device maker 106 evaluates a combination of channels pertaining to the user application 127 and finds applicable processing devices that are capable of accommodating the channels' resource needs. Subsequently, when the user requests to generate processing device code for the user application 127, the processing device maker 106 allows the user to select a desired processing device (targeted processing device 140) from the applicable processing devices described above.

In one embodiment, the processing device maker 106 finds applicable processing devices using predefined application projects (also referred to herein as base projects). A base project describes hardware components (e.g., blocks, pins, etc.) of a specific processing device.

Figure 2:
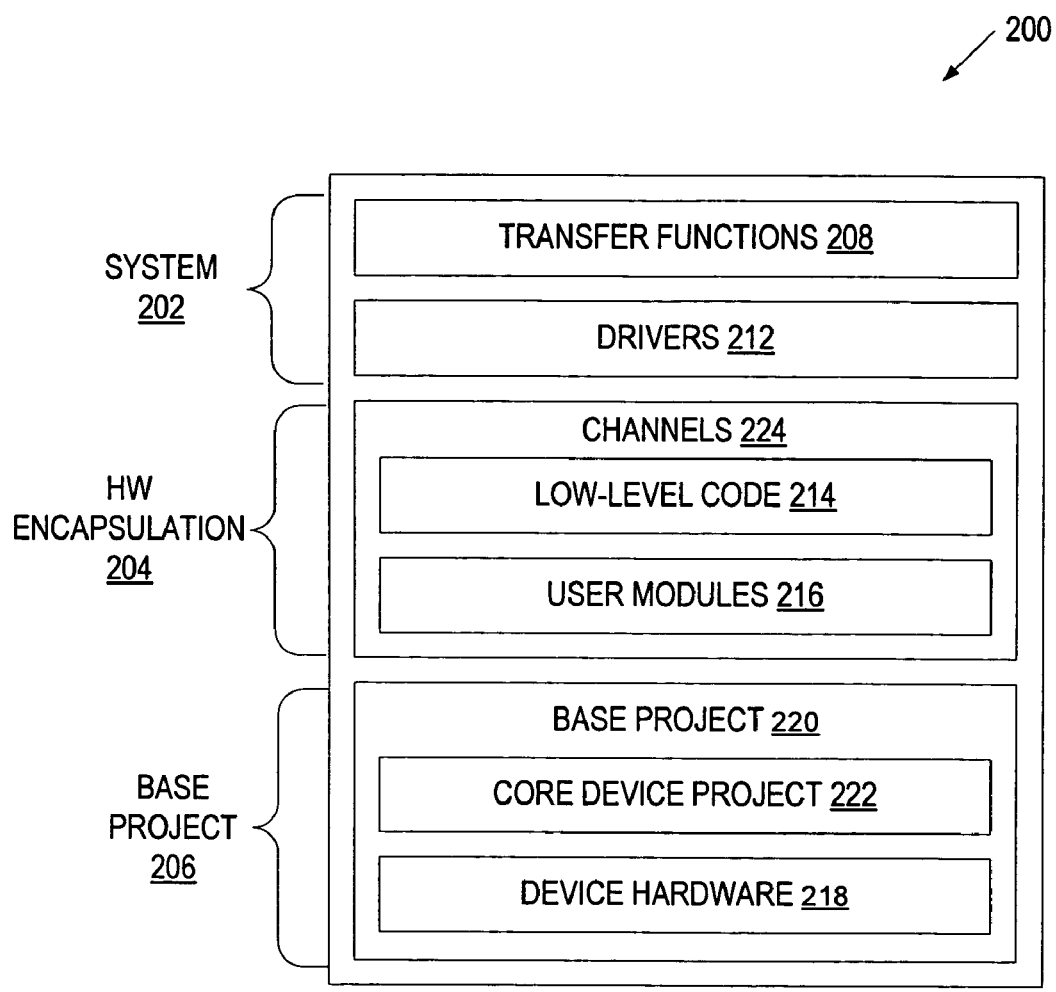
FIG. 2 illustrates a firmware stack model in accordance with one embodiment of the invention.

FIG. 2 illustrates a firmware stack model 200 in accordance with one embodiment of the invention is shown. Firmware stack 200 shows a logical structure of at least a portion of the processing device code 135. A portion of the stack 200 is abstracted away from specific hardware. Such hardware independency provides the automatic code generator 132 with a consistent architecture for stitching together various code blocks.

Firmware stack 200 includes a system layer 202, a hardware encapsulation layer 204, and a base project layer 206. The functionality of the system layer 202 is independent of the targeted processing device. Also, interfaces, such as Application Program Interfaces (APIs), made between system layer 202 and the remaining layers of firmware stack 200 are standardized regardless of the targeted processing device. The term "standardized" refers to the hardware independence of the APIs. This abstraction away from specific hardware allows system layer 202 to function without regard to the particular hardware. The low layers of firmware stack 200 have "knowledge" of the specific hardware and take care of the implementation details for the system layer 202.

The hardware encapsulation layer 204 and the base project layer 206 are generated based at least in part on the targeted processing device. Hardware encapsulation layer 204 represents the underlying hardware to system layer 202. Base project layer 206 includes a set of standard functions associated with the targeted processing device hardware. Base project layer 206 may include functionality at the register level of the targeted processing device.

System layer 202 may include transfer functions 208 and drivers 212. System layer 702 is targeted by an application level mapping function. Transfer functions 208 invoke the transfer functions defined by the user. The transfer functions are the highest level of the code. They have no knowledge about any hardware. They only know about variables set by a driver or used to set the output of a driver.

Drivers 212 represent I/O and interface devices to the user. In one embodiment, drives 212 may include three types: input, output, or interface. An output driver may be used with a device that is controlled by the user application, such as a fan or heater. Input drivers may be used for sensors, such as temperature or voltage sensors. Interface drivers may be used for devices that allow access to system variables and status, such as an Inter-Integrated Circuit (I2C) or a Serial Peripheral Interface (SPI).

Transfer functions 208 and drivers 212 may communicate with each other using APIs. Examples of APIs may include DriverName-Instantiate to initialize a device, DriverName_GetValue to return a value from an input device, and DriverName_SetValue to set an output of an output device to a specific value. These APIs are defined such that they may be invoked regardless of the particular hardware.

Drivers 212 communicate with hardware encapsulation layer 204 that include channels 224. Drivers include driver metadata and source code templates. In one embodiment, drivers 212 contain source code that converts channel information to a higher-level meaning. For example, the LM20 driver converts low-level voltage measured by the mVolts channel and converts it to its respective temperature value.

Channels 224 are hardware independent and are usually defined to provide a generic resource. These generic resources may be, for example, voltage measurements, PWM (pulse-width modulation) outputs, general purpose I/O, etc. A channel may be further defined by a channel type, such as an input voltage channel, an output voltage channel, or the like.

Channels 224 provide a platform for drivers 212 and dictate the interface between the base project layer 206 and drivers 212.

Channels 224 may include channel metadata and source code templates. The channel metadata is used to map drivers 212 onto the base project 220. The source code templates are used to generate the embedded application project. Channels 224 may also include low level code 214 and user modules 216. Low level code 214 provides the implementation of channels 224. User modules 216 perform hardware functions (e.g., analog to digital conversion) required by drivers. User modules 216 may be used with block arrays in processing device hardware 218 to form hardware components, such as an Analog-Digital Converter (ADC).

The base project layer 206 includes a base project 220 associated with a specific processing device such as the targeted processing device 140. The base project 220 includes a core device project 222 that describes unique configuration characteristics of the processing device (e.g., pin configuration that can be applied to the processing device), and processing device hardware 218.

Figure 3:
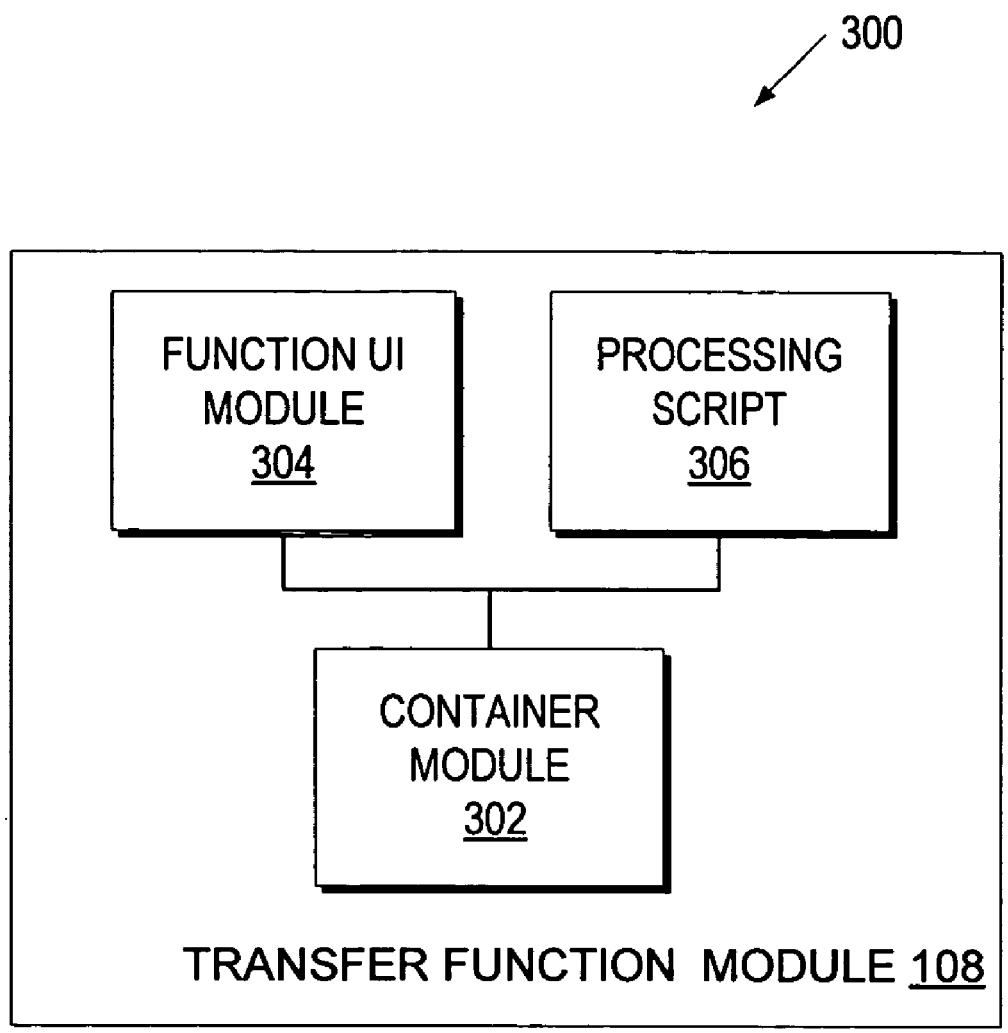
FIG. 3 is a block diagram of one embodiment of a transfer function module.

FIG. 3 is a block diagram of one embodiment of a transfer function module 108. The transfer function module 300 may include a container module 302, a function user interface (UI) module 304, and a processing script 306.

The function UI module 304 is responsible for presenting a UI associated with a function type selected by a user for a device driver or a valuator. Function types available for user selection are defined by developers of the application development tool 100 referred to herein as content authors. In one embodiment, a content author provides a set of files for each function type. These files may include, for example, a metadata file containing function metadata that defines characteristics pertaining to a function type, one or more UI files defining a UI for the function type, and a fragments file providing substitutions into a design project for the application. The function UI module 304 presents the UI associated with the selected function type based on the corresponding UI files.

The UI allows an end user to create a function of the selected type by customizing it according to the needs of the application being designed. In particular, in one embodiment, the end user is requested to provide input pertaining to variables used by the function. In one embodiment, the number of the variables and their behavior are predefined by the content author, and the end user input only specifies values for the variables. In another embodiment, the end user input provides more control over the variables and may specify, for example, the names of the variables to be used by the function or the number of the variables, and/or the behavior of some or all variables (e.g., using logic expressions).

In one embodiment, the function UI module 304 is also responsible for creating custom metadata based on the end user input. The function UI module 304 may create the custom metadata using the metadata file specific to the selected function type.

The processing script 306 is responsible for converting the custom metadata into expression metadata having a format understandable by a code generator 132. The processing script 306 may be a JavaScript or any other script capable of performing the conversion. The processing script 306 may be defined by the content author for the selected function type to describe relevant variables and their relationships. In one embodiment, the processing script 306 performs the conversion by creating variables to be updated by the function, and creating logic expressions applicable to the variables. The logic expressions may perform the custom logic and update the variables. These expressions may be programming language independent conditional and assignment expressions that can be applied to any variable in the system. In one embodiment, the processing script 306 also creates generic assignment expressions that expose the variables to other functions of the application.

The resulting expression metadata is then used by the code generator 132 to generate code used in the embedded application.

In an alternative embodiment, the variables and their behavior are predefined in the custom metadata schema, eliminating the need for the processing script 306. That is, once the end user provides values for the variables, the function's custom metadata is created and passed to the code generator 132 to generate code for the function.

In one embodiment, functions processed by the transfer function module 108 are multivariable transfer functions used for embedded applications. Examples of such transfer functions may include a State Machine that has both a State and a Transition variable, a PID Control transfer function having three or more variables, a Pulse-Width Modulator transfer function having frequency and duty cycle variables, etc.

Figure 4:
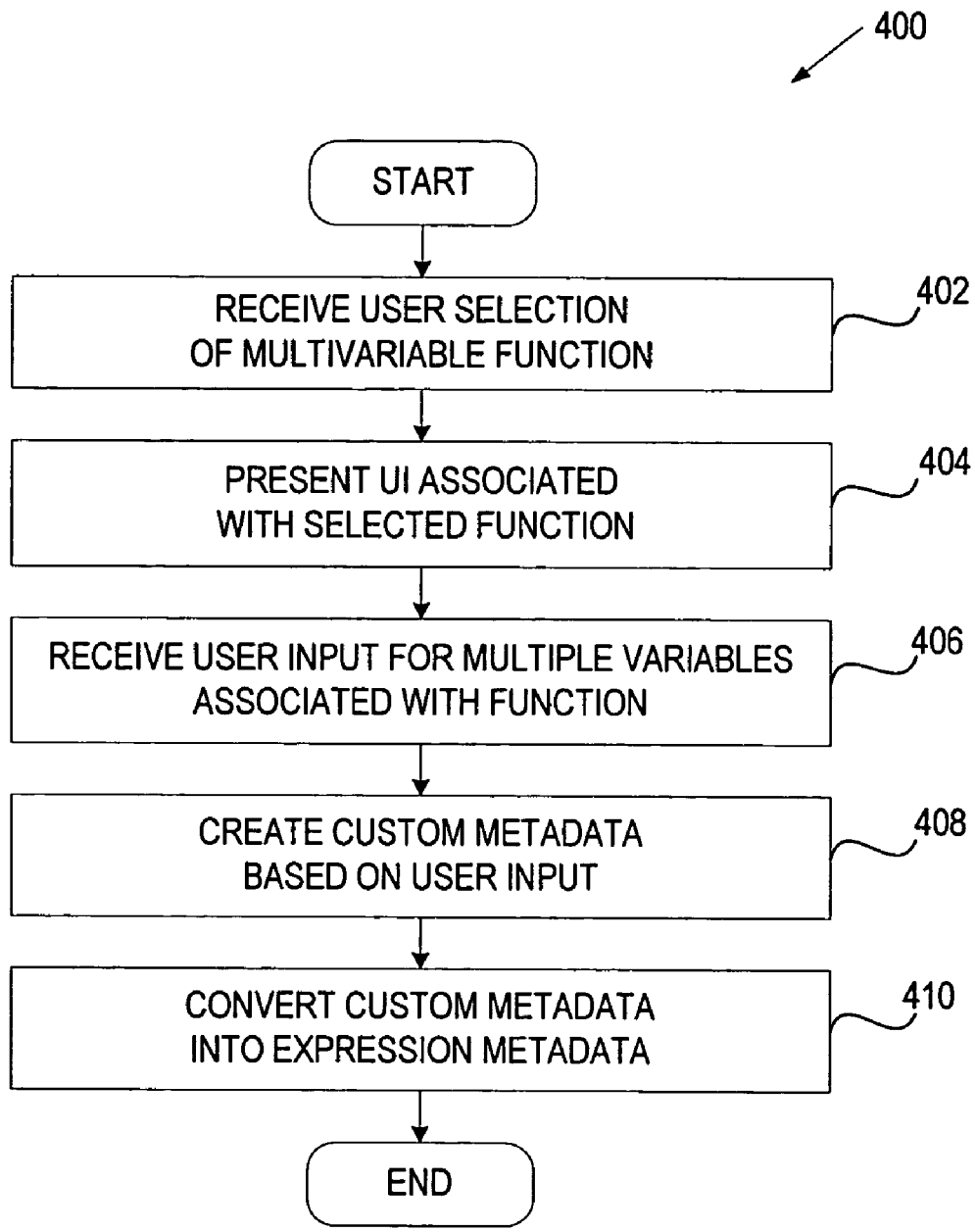
FIG. 4 is a flow diagram of one embodiment of a method for supporting multivariable functions of an application.

FIG. 4 is a flow diagram of one embodiment of a method 400 for constructing a transfer function. The method 400 may be performed by processing logic of the transfer function module 108. Processing logic may comprise hardware (e.g., circuitry, dedicated logic, programmable logic, microcode, etc.), software (such as run on a general purpose computer system or a dedicated machine), or a combination of both.

Referring to FIG. 4, method 400 begins with processing logic receiving a user selection of a multivariable function (block 402). Processing logic may receive the user selection via a design interface that allows the user to select input and output devices and valuators, and then facilitates user selection of transfer functions controlling the behavior of output devices and valuators.

At block 404, processing logic presents a function UI associated with the selected function. Processing logic may generate the function UI using custom UI files provided by the content author.

At block 406, processing logic receives user input for multiple variables pertaining to the selected function. In one embodiment, the user input specifies values for the variables predefined for the selected function. In another embodiment, the number of variables used by the selected function and their behavior may vary, and the user input specifies the variables to be used by the function or the number of the variables, and/or the behavior of some or all variables (e.g., using logic expressions).

At block 408, processing logic creates custom metadata based on input provided by the user via the function UI. Processing logic may create the custom metadata using a custom metadata file provided by the content author.

At block 410, processing logic converts the custom metadata into expression metadata having a format understandable by a code generator. The expression metadata is processed by the code generator to generate code for the multivariable transfer function.

In one embodiment, processing logic uses a script that performs the conversion by creating variables required by the function, and creating logic expressions applicable to the variables. The logic expressions may perform the custom logic and update the variables. These expressions may be programming language independent conditional and assignment expressions that can be applied to any variable in the system. In one embodiment, processing logic also creates generic assignment expressions that expose the variables to other functions of the application. In one embodiment, processing logic further generates value lists that maps values of the variables to the names understandable by the end user.

In an alternative embodiment, the variables and their behavior are predefined in the custom metadata schema, eliminating block 410. That is, processing logic passes the custom metadata created at block 408 to the code generator to generate code for the multivariable function.

Figure 5:
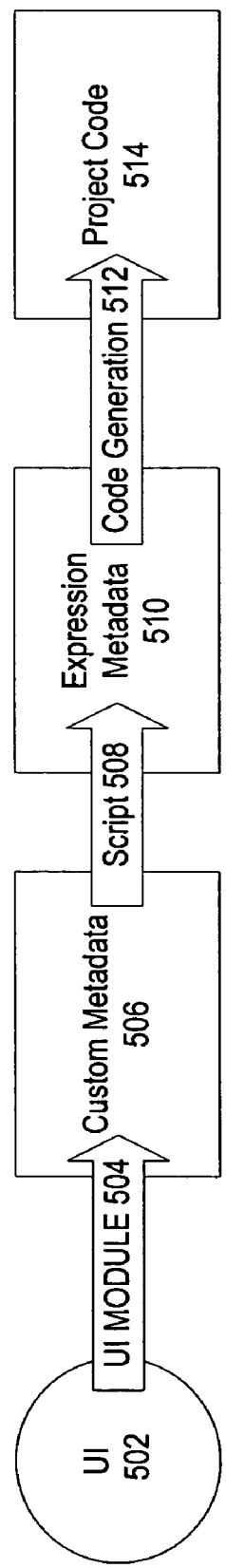
FIG. 5 illustrates the execution flow of a process for implementing a multivariable transfer function.

FIG. 5 illustrates the execution flow of a process for deploying a multivariable transfer function according to one embodiment of the present invention. The flow starts with presenting a function UI 502 to the user. Once the user enters data for variables used by the function via the UI 502, UI module 504 creates custom metadata 506 based on the entered data. Further, script 508 converts the custom metadata 506 into expression metadata 510, which is then used by code generator 512 to generate the project code 514.

Figure 6:
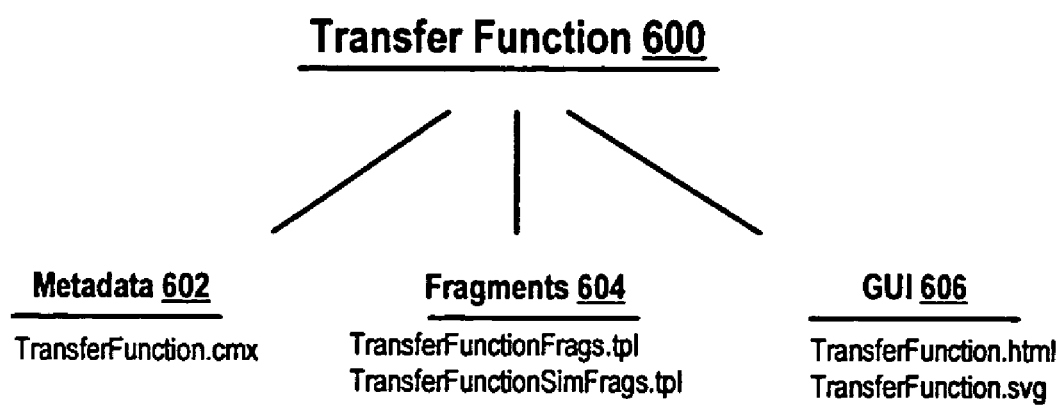
FIG. 6 illustrates an exemplary structure of a multivariable transfer function in accordance with one embodiment of the present invention.

FIG. 6 illustrates an exemplary structure of a multivariable transfer function 600, according to one embodiment of the present invention. The transfer function 600 includes transfer function metadata 602, fragment files 604 and GUI files 606.

The transfer function metadata 602 may be stored in XML format and be contained in the TranferFunctionName.cmx file. The metadata 602 may hold the file list for the transfer function as well as attributes describing the transfer function. These attributes may include information on whether the transfer function can have multiple inputs, what type of input is allowed, and should it be evaluated after other transfer functions. The attributes may also identify possible variables that can be updated by the transfer function and include other information.

The transfer function fragments 604 may provide substitutions into the application design project. They may allow a function call to be made each time through the main loop of the project. They may also allow the initialization of data structures that parameterize the transfer function.

The GUI 606 may include the html page seen by the user and the JavaScript logic (referred to as a processing script) that creates the variable and expression metadata in the project, as well as scalable vector graphics.

In one embodiment, a multivariable transfer function is defined by collecting drivers, variables and logic expressions needed to perform a system function into a single entity or object referred to herein as a container. The concept of container may be used to implement the State Machine functionality that uses two variables, State and Transition, along with logic expressions applied to the State variable. The container may also be used to implement the bank of switches functionality that packs the bits of individual input drivers into one variable. Another example is a controlled fan remote predictive mapping (RPM) output that contains a tach input and pwm output with logic expressions to adjust the output based on the input.

Containers provide for the abstraction of system behavior to a level above independent drivers, variables, and transfer functions. Drivers and variables with their associated transfer functions in the Container may interact in a set way to provide a system function. An end user does not need to understand this interaction and may treat the container as a single functional block. In addition, the abstraction layer reduces code duplication and reduces RAM requirements for grouped drivers because drivers in a Container may not need to have their own RAM and may not need to be exposed to the communication interface.

At a system level, transfer functions are applied to the drivers or variables. However, the user sees the container as a single functional block to which a transfer function is applied. For example, when the user selects a State Machine container, the user thinks of applying a transfer function to the container itself. In fact, the transfer function is applied to the State variable within the container. This translation of container transfer functions to variable transfer functions is performed using custom metadata defined for the container and a script for generating the variable and transfer function instances from the custom container metadata.

In one embodiment, custom U's are defined for containers by content authors to allow end users to configure the properties of the container. The UI may also create custom metadata in the format specific to the container. For example, for a state machine container, the UI may create a CMX_STATE_LIST and a CMX_STATE_TRANSITION_LIST. This metadata may then be processed by a script (e.g., JavaScript) that transforms the data into the actual variable, driver, and transfer function instances.

In one embodiment, drivers and variables within a container use a global RAM, and are visible to the rest of the system as if they were not in the container. Drivers that do not have ghost variables and do not use system RAM are only set by the transfer functions within the container and are not visible to the rest of the system. These variables may only be accessed through the visible variables and transfer function processing.

In one embodiment, containers are used in the context of drivers and functions, and are nested within these structures. For example, a state machine container may be the child of a CMX_FUNCTION called StateMachine while a Banked IO driver container may be the child of a CMX_IO_DRIVER. The container elements may be all children of the CMX_CONTAINER element. The CMX_CONTAINER may have various attributes such as NAME (the name of the container such as "STATEMACHINE"), INSTANCE_NAME (the container's instance-specific name), SETUP_SCRIPT (the path of the processing script that translates custom metadata into variable lists, driver lists, and container lists).

The custom metadata is used by the processing script to create the actual variable, driver, and transfer function instances. The custom metadata elements may be children of the CMX_CONTAINER element. Below is an example of custom metadata for a state machine container:

```
<CMX_STATE_LIST>
    <CMX_STATE NAME="Released" ORDER="0" DEFAULT="TRUE"/>
    <CMX_STATE NAME="Pressed" ORDER="1" DEFAULT=""/>
</CMX_STATE_LIST>
<CMX_STATE_TRANSITION_LIST>
    <CMX_STATE_TRANSITION NAME="ButtonPressed" EXPRESSION="button == button_Pressed" FROM_STATE="Released" TO_STATE="Pressed" PRIORITY="1" ORDINAL="1"/>
    <CMX_STATE_TRANSITION NAME="ButtonReleased" EXPRESSION="button == button_Released" FROM_STATE="Pressed" TO_STATE="Released" PRIORITY="3"
```

```
ORDINAL="2"/>
    <CMX_STATE_TRANSITION NAME="HeldDown" EXPRESSION="button ==
button_Pressed" FROM_STATE="Pressed" TO_STATE="Pressed" PRIORITY="2"
ORDINAL="3"/>
    <CMX_STATE_TRANSITION NAME="HeldUp" EXPRESSION="button ==
button_Released" FROM_STATE="Released" TO_STATE="Released" PRIORITY="4"
ORDINAL="4"/>
</CMX_STATE_TRANSITION_LIST>
```

In one embodiment, the CMX_VARIABLE_LIST is a child of the CMX_CONTAINER and is partially or fully generated by the processing script. It contains the variables and their associated value lists and transfer function lists. The CMX_IO_DRIVER_LIST is a child of the CMX_CONTAINER and can be partially or fully generated by the processing script. It contains the IO drivers in the container. In one embodiment, IO drivers in containers are treated differently than regular system IO drivers. In particular, system IO drivers may have a generated call to the driver's GetValue/SetValue function that retrieves/assigns its value to the associated global variable. Container drivers may be encapsulated and isolated from the rest of the system and do not use ghost variables. The generated call of SetValue/GetValue may be suppressed for container drivers and there may only be one SetValue/GetValue call for the container.

A container may have a list of containers nested within it. For example, a container could include a state machine container in addition to an IO driver. CMX_CONTAINER_LIST may contain the nested containers and can be partially or fully generated by the processing script.

In one embodiment, the processing script processes the containers custom metadata to generate the driver list, variable list, container list, and any associated transfer functions. The script may be a JavaScript file that is specified in the SETUP_SCRIPT attribute of the CMX_CONTAINER element. The script may use the MSXML DOM processing object to build up the lists and transfer functions from the custom meta-data.

The code generation processing for elements of a container may be similar to variables and drivers outside of a container. However, container drivers may not use global RAM and their ghost variables may not be created in the SystemVars structure. Instead, the calls to GetValue and SetValue may be handled by the transfer function expressions within the container.

Figure 7:
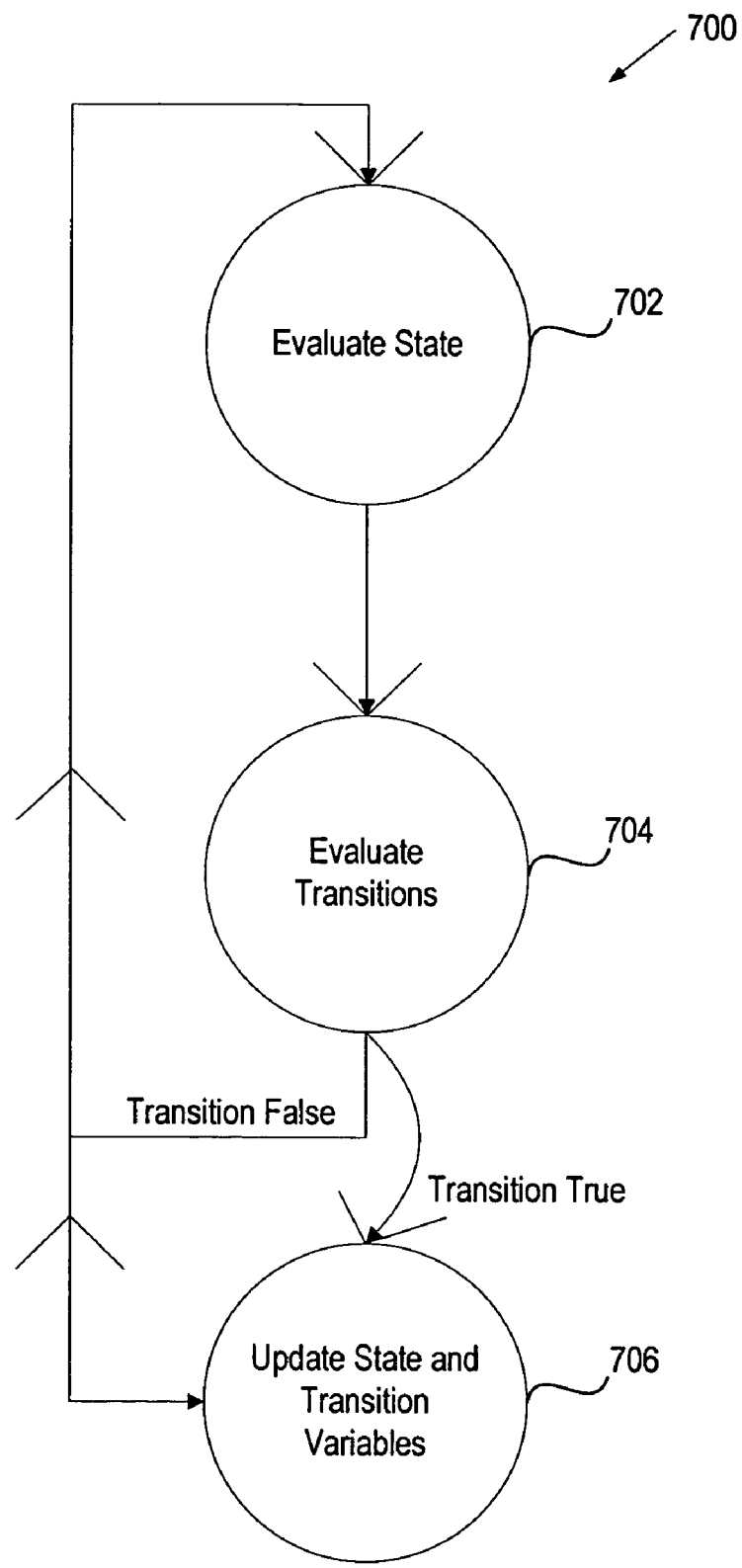
FIG. 7 illustrates the operation of a state machine valuator.

A State Machine Valuator (SMV) utilizes the State Machine container model. FIG. 7 illustrates the functionality of a SMV 700, according to one embodiment. SMV 700 uses a model of behaviour composed of states and transitions. A state stores information about the past, i.e., it reflects the input changes from the system start to the present moment. A transition indicates a state change and is described by a condition that would need to be fulfilled to enable the transition.

SMV 700 evaluates a current state 702 and transitions 704. If a condition for a transition to a different state is not satisfied, SMV 700 returns to 702. Otherwise, SMV 700 updates the state and transition variables 706 and then returns to 702.

In one embodiment, the SMV is presented to the user as a transfer function (e.g., in a New Valuator Dialog Box). When "StateMachine" is selected, a corresponding UI is displayed to allow the user to customize the SMV. In particular, the user may be allowed to add, delete and edit states and transitions for the SMV. The user can also select any state as a default state. The default state is the state that the state machine will be in at start up. The user may also select any state as an active state.

Figure 9:
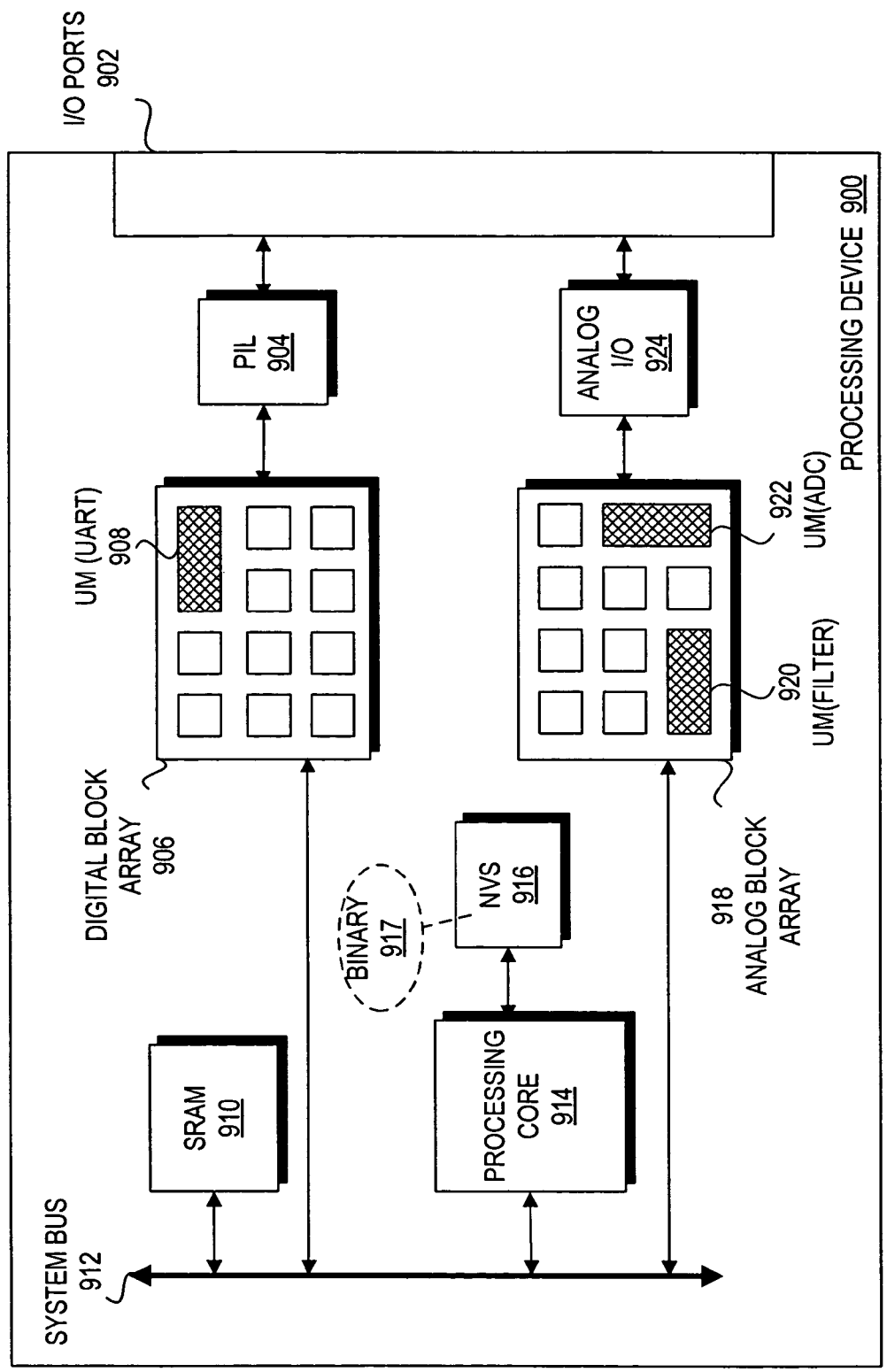
FIG. 9 is a block diagram of one embodiment of a processing device.

Turning to FIG. 9, an embodiment of a processing device 900 is shown. Processing device 900 includes a microcontroller. Processing device 900 includes Input/Output (I/O) ports 902. In one embodiment, I/O ports 902 are programmable. I/O ports 902 are coupled to a Programmable Interconnect and Logic (PIL) 904 which is coupled to a digital block array 906. In FIG. 9, digital block array 906 includes a UM 908 that has been configured as a Universal Asynchronous Receive/Transmitter (UART). Digital block array 906 is coupled to a system bus 912.

A Static Random Access Memory (SRAM) 910 and a processing core 914 are also coupled to system bus 912. Processing core 914 is coupled to NVS 916 which has stored a binary 917. In one embodiment, binary 917 includes instructions generated as described herein. In another embodiment, binary 917 may include instructions executable by processing core 914 as well as instructions for configuring block arrays 916 and 918.

Analog block array 918 is coupled to system bus 912. In the embodiment of FIG. 9, analog block array 918 includes a UM 920 configured as a filter and a UM 922 configured as an ADC. Analog block array 918 is also coupled to an analog I/O unit 924 which is coupled to I/O ports 902. Processing device 900 may also include other components, not shown for clarity, including a clock generator, an interrupt controller, an I2C, or the like.

Figure 8:
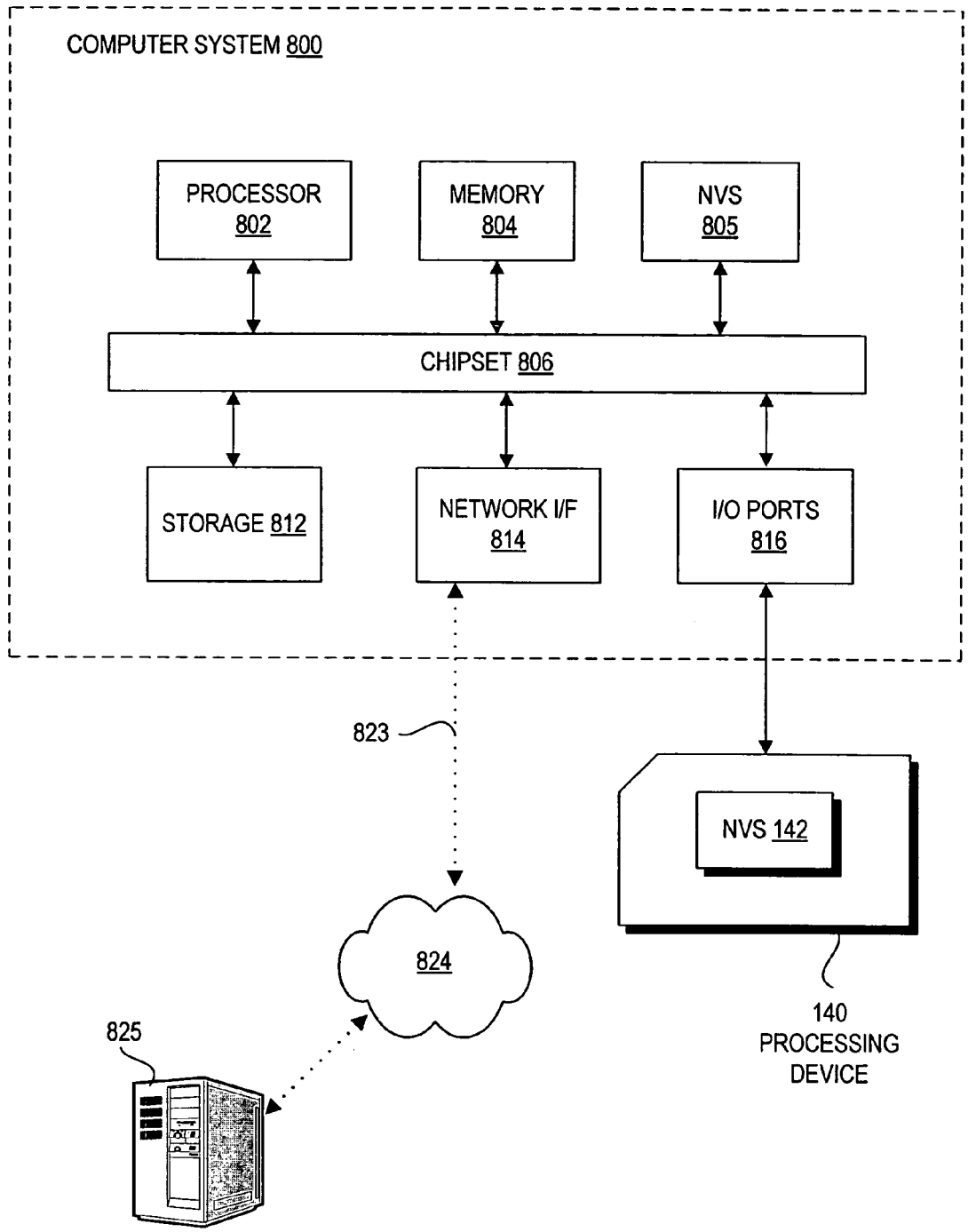
FIG. 8 is a block diagram of one embodiment of a computer system.

FIG. 8 illustrates an exemplary computer system 800 on which embodiments of the present invention may be implemented. Computer system 800 includes a processor 802 and a memory 804 coupled to a chipset 806. Storage 812, Non-Volatile Storage (NVS) 805, network interface (I/F) 814, and Input/Output (I/O) ports 816 may also be coupled to chipset 806. Embodiments of computer system 800 include, but are not limited to, a desktop computer, a notebook computer, a server, a personal digital assistant, a network workstation, or the like. In one embodiment, processor 802 executes instructions stored in memory 804.

Memory 804 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like.

Chipset 806 may include a memory controller and an input/output controller. Chipset 806 may also include system clock support, power management support, audio support, graphics support, or the like. In one embodiment, chipset 806 is coupled to a board that includes sockets for processor 802 and memory 804.

Components of computer system 800 may be connected by various interconnects. Such interconnects may include a Peripheral Component Interconnect (PCI), a System Management bus (SMBUS), a Low Pin Count (LPC) bus, a Serial Peripheral Interface (SPI) bus, an Accelerated Graphics Port (AGP) interface, or the like.

I/O ports 816 may include ports for a keyboard, a mouse, a display, a printer, a scanner, or the like. Embodiments of I/O ports 816 include a Universal Serial Bus port, a Firewire port, a Video Graphics Array (VGA) port, a Personal System/2 (PS/2) port, or the like.

Processing device 140 may be coupled to computer system 800 via I/O ports 816. Computer system 800 may have stored computer-readable instructions, in accordance with embodiments described herein, to allow a user to design the application 122 using UIs described herein and automatically generate processing device code for processing device 140 using computer system 800. This code may be compiled into a binary and loaded into NVS 142.

Computer system 800 may interface to external systems through network interface 814. Network interface 814 may include, but is not limited to, a modem, a Network Interface Card (NIC), or other interfaces for coupling a computer system to other computer systems. A carrier wave signal 823 may be received/transmitted by network interface 814. In the embodiment illustrated in FIG. 8, carrier wave signal 823 is used to interface computer system 800 with a network 824, such as a Local Area Network (LAN), a Wide Area Network (WAN), the Internet, or any combination thereof. In one embodiment, network 824 is further coupled to a computer system 825 such that computer system 800 and computer system 825 may communicate over network 824.

Computer system 800 also includes non-volatile storage 805 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 812 includes, but is not limited to, a magnetic disk drive, a magnetic tape drive, an optical disk drive, or the like. It is appreciated that instructions executable by processor 802 may reside in storage 812, memory 804, non-volatile storage 805, or may be transmitted or received via network interface 814.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-readable medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method for an application development tool, the method comprising:
receiving, by processing logic of a computer running the application development tool, user input pertaining to a plurality of variables associated with a multivariable function of an application, wherein the multivariable function defines a behavior of the application and defines a relationship between an input device and an output device selected for the application; and
causing code for the function to be automatically generated to update the plurality of variables based on the user input.

2. The method of claim 1 wherein the application is an embedded application for a processing device.

3. The method of claim 1 further comprising:
receiving a user selection of the function; and
presenting a user interface (UI) associated with the function, the UI facilitating the user input pertaining to the plurality of variables.

4. The method of claim 1 wherein causing code for the function to be automatically generated comprises:
creating custom metadata based on the user input; and
converting the custom metadata into expression metadata having a format understandable by a code generator.

5. The method of claim 4 wherein the custom metadata is converted using a processing script.

6. The method of claim 5 wherein the processing script is used if a number of the plurality of variables or a behavior of any of the plurality of variables is controlled by the user input.

7. The method of claim 4 wherein converting the custom metadata into the expression metadata comprises:
creating the plurality of variables pertaining to the function; and
creating logic expressions specific to the function.

8. The method of claim 7 wherein the logic expressions are defined to perform custom logic and update the plurality of variables.

9. The method of claim 7 further comprising:
generating value lists that map values of the plurality of variables to names understandable by a user.

10. The method of claim 7 further comprising:
creating generic assignment expressions to expose the plurality of variables to other functions of the application.

11. The method of claim 1 wherein the function is defined using a container, which represents a collection of drivers, variables and logic expressions coupled to perform a system function within the application.

12. The method of claim 11 wherein causing code for the function to be automatically generated comprises:
creating custom metadata specific to the container based on the user input; and
converting the custom metadata into variables, drivers and transfer function expressions.

13. An article of manufacture comprising:
a machine-readable medium including a plurality of instructions which when executed perform a method comprising:
receiving user input pertaining to a plurality of variables associated with a multivariable function of an application, wherein the multivariable function defines a behavior of the application and defines a relationship between an input device and an output device selected for the application; and
causing code for the function to be automatically generated to update the plurality of variables based on the user input.

14. The article of manufacture of claim 13 wherein the method further comprises:
receiving a user selection of the function; and
presenting a user interface (UI) associated with the function, the UI facilitating the user input pertaining to the plurality of variables.

15. The article of manufacture of claim 13 wherein causing code for the function to be automatically generated comprises:
creating custom metadata based on the user input; and
converting the custom metadata into expression metadata having a format understandable by a code generator.

16. The article of manufacture of claim 15 wherein converting the custom metadata into the expression metadata comprises:
creating the plurality of variables pertaining to the function; and
creating logic expressions specific to the function.

17. An apparatus comprising:
a processing device; and
a memory, coupled to the processing device, the memory storing:
a function user interface module (UI) to receive user input pertaining to a plurality of variables associated with a multivariable function of an application, wherein the multivariable function defines a behavior of the application and defines a relationship between an input device and an output device selected for the application; and
a processing script to cause code for the function to be automatically generated to update the plurality of variables based on the user input.

18. The apparatus of claim 17 wherein the processing script is configured to
create custom metadata based on the user input, and
convert the custom metadata into expression metadata having a format understandable by a code generator.

19. The apparatus of claim 17 wherein the function is defined by data in a container, wherein the data represents a collection of drivers, variables and logic expressions coupled to perform a system function within the application.

20. The apparatus of claim 19 wherein the processing script is configured to
create custom metadata specific to the container based on the user input, and
convert the custom metadata into variables, drivers and transfer function expressions.

* * * * *